United States Patent
Sogoh et al.

(10) Patent No.: US 8,295,694 B2
(45) Date of Patent: Oct. 23, 2012

(54) VIBRATION REDUCTION DEVICE AND CAMERA

(75) Inventors: Chie Sogoh, Yokohama (JP); Junichi Omi, Yokohama (JP)

(73) Assignee: Nikon Corporation, Tokyo (JP)

( * ) Notice: Subject to any disclaimer, the term of this patent is extended or adjusted under 35 U.S.C. 154(b) by 954 days.

(21) Appl. No.: 11/714,138

(22) Filed: Mar. 6, 2007

(65) Prior Publication Data

US 2007/0212046 A1    Sep. 13, 2007

(30) Foreign Application Priority Data

Mar. 7, 2006 (JP) .................................. 2006-061132

(51) Int. Cl.
G03B 17/00 (2006.01)
H04N 5/228 (2006.01)
G02B 27/64 (2006.01)

(52) U.S. Cl. .................. 396/55; 348/208.2; 348/208.11; 359/557

(58) Field of Classification Search .................... 396/55, 396/52; 348/208.99, 208.2, 208.4, 208.7, 348/208.11; 359/554, 557

See application file for complete search history.

(56) References Cited

U.S. PATENT DOCUMENTS

| | | |
|---|---|---|
| 5,266,988 A | 11/1993 | Washisu |
| 5,854,947 A | 12/1998 | Imura |
| 5,905,917 A | 5/1999 | Imura |
| 5,926,656 A | 7/1999 | Imura et al. |
| 5,974,270 A | 10/1999 | Imura et al. |
| 6,011,927 A | 1/2000 | Kamata |
| 6,154,611 A | 11/2000 | Washisu |
| 2001/0028516 A1 | 10/2001 | Noguchi |
| 2001/0030275 A1 | 10/2001 | Tsukamoto et al. |
| 2003/0044175 A1 | 3/2003 | Enomoto |
| 2005/0057662 A1 | 3/2005 | Washisu |
| 2005/0264656 A1 | 12/2005 | Seo et al. |
| 2006/0018645 A1 | 1/2006 | Stavely |
| 2006/0176373 A1 | 8/2006 | Ito et al. |

FOREIGN PATENT DOCUMENTS

| | | |
|---|---|---|
| JP | 02-081009 | 3/1990 |
| JP | 08-076165 | 3/1996 |
| JP | 10-3101 | 1/1998 |
| JP | 10-3102 | 1/1998 |
| JP | 10-90744 | 4/1998 |
| JP | 10-186431 | 7/1998 |
| JP | 10-228044 | 8/1998 |
| JP | 10-254009 | 9/1998 |
| JP | 10-254013 | 9/1998 |
| JP | 10-254015 | 9/1998 |
| JP | 10-254016 | 9/1998 |
| JP | 2000-330153 | 11/2000 |
| JP | 2001-201777 | 7/2001 |
| JP | 2001-305434 | 10/2001 |

(Continued)

OTHER PUBLICATIONS

European Search Report for corresponding European Application 10185561.7; dated Dec. 14, 2010.

(Continued)

*Primary Examiner* — Rochelle-Ann J Blackman

(57) ABSTRACT

A vibration reduction device includes: an optical system that comprises a vibration reduction optical system; a first driving unit that moves the vibration reduction optical system in a first direction; a second driving unit that moves the vibration reduction optical system in a second direction that differs from the first direction. An optical axis of the vibration reduction optical system is located between the first driving unit and the second driving unit.

21 Claims, 5 Drawing Sheets

FOREIGN PATENT DOCUMENTS

| | | |
|---|---|---|
| JP | 2002-296491 | 10/2002 |
| JP | 2003-57707 | 2/2003 |
| JP | 2003-057707 | 2/2003 |
| JP | 2003-75881 | 3/2003 |
| JP | 2003-149699 | 5/2003 |
| JP | 2003-255422 | 10/2003 |
| JP | 2003-322889 | 11/2003 |
| JP | 2004-177530 | 6/2004 |
| JP | 2005-077886 | 3/2005 |
| JP | 2005-84655 | 3/2005 |
| JP | 2005-217993 | 8/2005 |
| JP | 2005-221603 | 8/2005 |
| JP | 2005-352125 | 12/2005 |
| JP | 2006-243701 | 9/2006 |
| JP | 2006-267752 | 10/2006 |
| JP | 2007-233214 | 9/2007 |

OTHER PUBLICATIONS

Extended European Search Report for corresponding European Application 10185561.7-2217; dated Apr. 15, 2011.

European Office Action for corresponding European Application 07 103 623.0-2217; dated Apr. 6, 2011.

Japanese Office Action for corresponding Japanese Application 2006-061132; mailed Jun. 7, 2011.

Japanese Office Action for corresponding Japanese Application 2006-061132; mailed Feb. 15, 2011.

Partial European Search Report, mailed Jun. 15, 2007 and issued in corresponding European Patent Application No. 07103623.0-2217.

Extended European Search Report issued in corresponding European Patent Application No. 07103623.0, on Oct. 2, 2007.

VIBRATION REDUCTION DEVICE AND CAMERA

INCORPORATION BY REFERENCE

The disclosure of the following priority application is herein incorporated by reference: Japanese Patent Application No. 2006-061132 filed Mar. 7, 2006

BACKGROUND OF THE INVENTION

1. Field of the Invention

The present invention relates to a vibration reduction device and a camera including a vibration reduction device.

2. Description of the Related Art

A vibration reduction device is known having a mechanism in which a part of a photographic optical system is moved on a plane orthogonal to the optical axis so as to reduce image blur due to vibration of a camera and so forth.

Japanese Patent Application Laid-Open No. 2003-57707 discloses a vibration reduction device having a configuration in which a pair of electromagnetic actuators for driving a vibration reduction lens group is disposed around the optical axis of the vibration reduction lens group. Here, the electromagnetic actuators are disposed with a rotational symmetry of 90 degrees around the optical axis of the vibration reduction lens group.

In recent years, there has been a demand for small-sized and slim cameras, leading to a demand for a small-size vibration reduction device which can be used as a built-in vibration reduction device of a camera.

SUMMARY OF THE INVENTION

According to a 1st aspect of the present invention, a vibration reduction device includes: an optical system that comprises a vibration reduction optical system; a first driving unit that moves the vibration reduction optical system in a first direction; a second driving unit that moves the vibration reduction optical system in a second direction that differs from the first direction, wherein an optical axis of the vibration reduction optical system is located between the first driving unit and the second driving unit.

According to a 2nd aspect of the present invention, in the vibration reduction device according to the 1st aspect, a longitudinal direction of the first driving unit and a longitudinal direction of the second driving unit may be orthogonal to the first direction and the second direction, respectively, and the first direction and the second direction may intersect at 90 degrees.

According to a 3rd aspect of the present invention, in the vibration reduction device according to the 2nd aspect, it is preferable that the first driving unit and the second driving unit are disposed on a plane orthogonal to the optical axis of the vibration reduction optical system in line symmetry with respect to a predetermined line passing through the optical axis.

According to a 4th aspect of the present invention, the vibration reduction device according to the 1st aspect may further include: a holding member that holds the vibration reduction optical system, and it is preferable that the first driving unit and the second driving unit move the holding member within a plane orthogonal to an optical axis of the optical system so as to move the vibration reduction optical system along the first direction and the second direction.

According to a 5th aspect of the present invention, the vibration reduction device according to the 4th aspect may further include a fixed member that comprises an opening through which a light flux passes so as to pass through the vibration reduction optical system, and that holds the holding member in a manner that allows the holding member to be moved within a plane orthogonal to the optical axis of the optical system.

According to a 6th aspect of the present invention, the vibration reduction device according to the 1st aspect may further include: a first position detection unit that detects a position of the vibration reduction optical system along the first direction; and a second position detection unit that detects a position of the vibration reduction optical system along the second direction, and it is preferable that the optical axis of the vibration reduction optical system matches an intersection of a first detection center line, which passes through a center of the first position detection unit and which is parallel to the first direction, and a second detection center line which passes through a center of the second position detection unit and which is parallel to the second direction.

According to a 7th aspect of the present invention, in the vibration reduction device according to the 6th aspect, it is preferable that at least a part of the first position detection unit and the second position detection unit is disposed between the first driving unit and the second driving unit.

According to a 8th aspect of the present invention, a vibration reduction device includes: an optical system that comprises a vibration reduction optical system; a first driving unit that moves the vibration reduction optical system in a first direction; a second driving unit that moves the vibration reduction optical system in a second direction that differs from the first direction, wherein: an optical axis of the vibration reduction optical system is located offset by a predetermined distance from an intersection of a first driving center line, which passes through a center of the first driving unit and which is parallel to the first direction, and a second driving center line which passes through a center of the second driving unit and which is parallel to the second direction; and the optical axis of the vibration reduction optical system is located at a position closer to at least one of the first driving unit and the second driving unit than as to the intersection.

According to a 9th aspect of the present invention, in the vibration reduction device according to the 8th aspect, a longitudinal direction of the first driving unit and a longitudinal direction of the second driving unit may be orthogonal to the first direction and the second direction, respectively; and the first direction and the second direction may intersect at 90 degrees.

According to a 10th aspect of the present invention, the vibration reduction device according to the 9th aspect, it is preferable that the first driving unit and the second driving unit are disposed on a plane orthogonal to the optical axis of the vibration reduction optical system in line symmetry with respect to a predetermined line passing through the optical axis.

According to a 11th aspect of the present invention, the vibration reduction device according to the 8th aspect may further include: a holding member that holds the vibration reduction optical system, and it is preferable that the first driving unit and the second driving unit move the holding member within a plane orthogonal to an optical axis of the optical system so as to move the vibration reduction optical system along the first direction and the second direction.

According to a 12th aspect of the present invention, the vibration reduction device according to the 11th aspect may further include: a fixed member that comprises an opening through which a light-flux passes to pass through the vibration reduction optical system, and that holds the holding member in a manner that allows the holding member to be moved within a plane orthogonal to the optical axis of the optical system.

According to a 13th aspect of the present invention, the vibration reduction device according to the 8th aspect may further include: a first position detection unit that detects a position of the vibration reduction optical system along the first direction; and a second position detection unit that detects a position of the vibration reduction optical system along the second direction, and it is preferable that the optical axis of the vibration reduction optical system matches an intersection of a first detection center line, which passes through a center of the first position detection unit and which is parallel to the first direction, and a second detection center line which passes through a center of the second position detection unit and which is parallel to the second direction.

According to a 14th aspect of the present invention, in the vibration reduction device according to the 13th aspect, at least parts of the first position detection unit and the second position detection unit may be disposed between the first driving unit and the second driving unit.

According to a 15th aspect of the present invention, a vibration reduction device include: an optical system that comprises a vibration reduction optical system; a first driving unit that moves the vibration reduction optical system in a first direction; a second driving unit that moves the vibration reduction optical system in a second direction that differs from the first direction, wherein: an optical axis of the vibration reduction optical system is located offset by a predetermined distance from an intersection of a first driving center line, which passes through a center of the first driving unit and which is parallel to the first direction, and a second driving center line which passes through a center of the second driving unit and which is parallel to the second direction; and at least a part of the vibration reduction optical system is located between the first driving unit and the second driving unit.

According to a 16th aspect of the present invention, a vibration reduction device include: an optical system; an image sensor that captures an image of a subject formed by the optical system; a movable member that holds the image sensor, and that is movable within a plane orthogonal to an optical axis of the optical system; a first driving unit that moves the movable member in a first direction orthogonal to the optical axis; and a second driving unit that moves the movable member in a second direction that differs from the first direction, wherein: a center of the image sensor is located between the first driving unit and the second driving unit.

According to a 17th aspect of the present invention, a vibration reduction device includes: an optical system; an image sensor that captures an image of a subject formed by the optical system; a movable member that holds the image sensor, and that is movable within a plane orthogonal to an optical axis of the optical system; a first driving unit that moves the movable member in a first direction orthogonal to the optical axis; and a second driving unit that moves the movable member in a second direction that differs from the first direction, wherein: a center of the image sensor is located offset by a predetermined distance from an intersection of a first driving center line, which passes through a center of the first driving unit and which is parallel to the first direction, and a second driving center line which passes through a center of the second driving unit and which is parallel to the second direction; and the center of the image sensor is located at a position closer to at least one of the first driving unit and the second driving unit than as to the intersection.

According to a 18th aspect of the present invention, in the vibration reduction device according to the 1st aspect, it is preferable that the optical system comprises an optical axis bending unit that changes a direction of an optical axis of the optical system.

According to a 19th aspect of the present invention, in the vibration reduction device according to the 8th aspect, it is preferable that the optical system comprises an optical axis bending unit that changes a direction of an optical axis of the optical system.

According to a 20th aspect of the present invention, a camera includes: a vibration reduction device, wherein the vibration reduction device comprises: an optical system that comprises a vibration reduction optical system; a first driving unit that moves the vibration reduction optical system in a first direction; a second driving unit that moves the vibration reduction optical system in a second direction that differs from the first direction, wherein: an optical axis of the vibration reduction optical system is located between the first driving unit and the second driving unit.

According to a 21st aspect of the present invention, a camera includes: a vibration reduction device, wherein the vibration reduction device comprises: an optical system that comprises a vibration reduction optical system; a first driving unit that moves the vibration reduction optical system in a first direction; a second driving unit that moves the vibration reduction optical system in a second direction that differs from the first direction, wherein: an optical axis of the vibration reduction optical system is located offset by a predetermined distance from an intersection of a first driving center line, which passes through a center of the first driving unit and which is parallel to the first direction, and a second driving center line which passes through a center of the second driving unit and which is parallel to the second direction; and the optical axis of the vibration reduction optical system is located at a position closer to at least one of the first driving unit and the second driving unit than as to the intersection.

DESCRIPTION OF THE PREFERRED EMBODIMENTS

Figure 1:
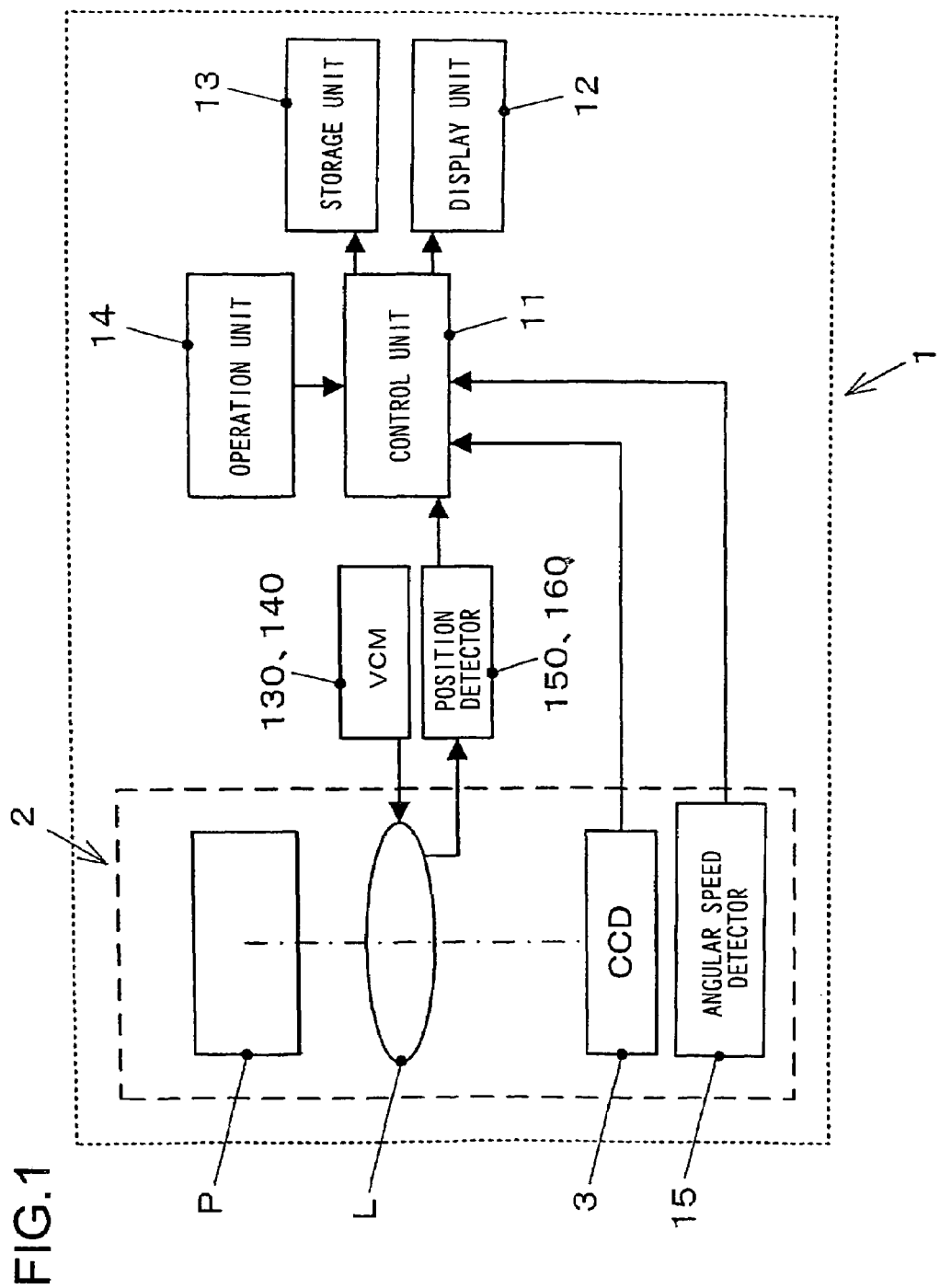
FIG. 1 is a block configuration diagram which shows a camera including a vibration reduction device according to an embodiment of the present invention.

FIG. 1 is a block diagram which shows a camera 1 including a vibration reduction device according to an embodiment of the present invention. Now, description will be made regarding an example in which the camera 1 is a digital still camera including an optical axis bending system that changes the direction of the optical axis in a photographic optical system. As shown in FIG. 1, the camera 1 includes a lens barrel 2, a control unit 11, a display unit 12, a storage unit 13, an operation unit 14, and so forth.

The lens barrel 2 includes a prism P which is an optical-axis bending unit that changes the direction of the optical axis, a lens L, an image sensor 3, and so forth. The light input to the lens barrel 2 from an unshown subject is deflected by the prism P by 90 degrees. Then, the image of the subject is formed on the image sensor 3 by the lens L. While the lens L includes multiple lenses such as a zoom lens, focus lens, vibration reduction lens, etc., FIG. 1 collectively shows these lenses in the form of the lens L for convenience of explanation. Detailed description will be made later regarding the lens barrel 2 with reference to FIG. 2.

The image sensor 3 is a photoelectric conversion device such as a CCD, CMOS, or the like, for example. The image sensor 3 converts the incident light to the image forming plane into an electric signal. The electric signal thus converted is transmitted to the control unit 11 as an image signal. The control unit 11 includes an ASIC and so forth, which controls the overall system of the camera 1. Upon reception of an image signal from the image sensor 3, the control unit 11 performs predetermined processing for the image signal thus input. After the image data has been subjected to the processing by the control unit 11, and has been converted into JPEG file format as necessary, the image data is stored in the storage unit 13. Furthermore, the image data thus processed by the control unit 11 is displayed on the display unit 12 such as a liquid crystal display or the like provided to the camera 1. The storage unit 13 is an external storage medium detachably mounted to the camera 1, for example.

The operation unit 14 is an operating unit which provides the user operation, including a release button, a zoom-button, a cross button that allows various photographic modes to be set, and so forth. For example, upon the user operating the release button of the operation unit 14, the control unit 11 performs opening/closing action of an unshown shutter so as to have the image sensor 3 exposed for a predetermined period of time, thereby capturing an image of the subject. Also, upon operating the zoom button, the control unit 11 drives an unshown motor so as to move the zoom lens, thereby changing the power of the zoom lens at which to form a subject image on the image sensor 3.

Voice coil motors (VCM) 130 and 140 are actuators that move the vibration reduction lens group included in the lens L for reducing the image vibration or image blur due to vibration of the camera. Position detectors 150 and 160 detect the position of the vibration reduction lens group, and transmits the detection results to the control unit 11. The control unit 11 controls and drives the VCMs 130 and 140 based upon the position of the vibration reduction lens group thus detected by the position detectors 150 and 160. Detailed description will be made later regarding vibration reduction control using the VCMs 130 and 140, the position detectors 150 and 160, and the vibration reduction lens group.

An angular speed detector 15 is a sensor for detecting the motion of the camera 1 occurring due to vibration of the hand-held camera 1 and so forth. The angular speed detector 15 includes an angular speed sensor for detecting the rotation (pitching) around the horizontal axis (X axis shown in FIG. 2) of the camera 1, and an angular sensor for detecting the rotation (yawing) around the vertical axis (Z axis shown in FIG. 2) of the camera 1.

Upon the user operating the release button, the angular-speed detector 15 detects the angular speeds of the camera 1, and outputs the detected signals to the control unit 11. The control unit 11 computes the tilt angles of the camera 1 based upon the detected signals received from the angular speed detector 15. Then, the control unit 11 calculates the distance and the direction of the movement of the vibration reduction lens group necessary for reducing the vibration based upon the position of the vibration reduction lens group thus detected by the position detectors 150 and 160 and the tilt angles of the camera 1. Note that the control unit 11 calculates the distance and the direction of the movement of the vibration reduction lens group giving consideration to the change in the optical axis by the optical-axis bending unit, and the difference between the detection directions of the position detectors 150 and 160 and the directions along the XYZ axes.

The control unit 11 outputs a control signal to the VCMs 130 and 140 based upon the movement parameters thus calculated. Then, the VCMs 130 and 140 moves the vibration reduction lens group according to the control signal. With such an arrangement, even if vibration has occurred at the time of capturing an image, the vibration reduction lens group is moved so as to cancel the vibration, thereby reducing image vibration or image blur occurring in a captured image.

Next, description will be made regarding the lens barrel 2 with reference to FIG. 2.

Figure 2:
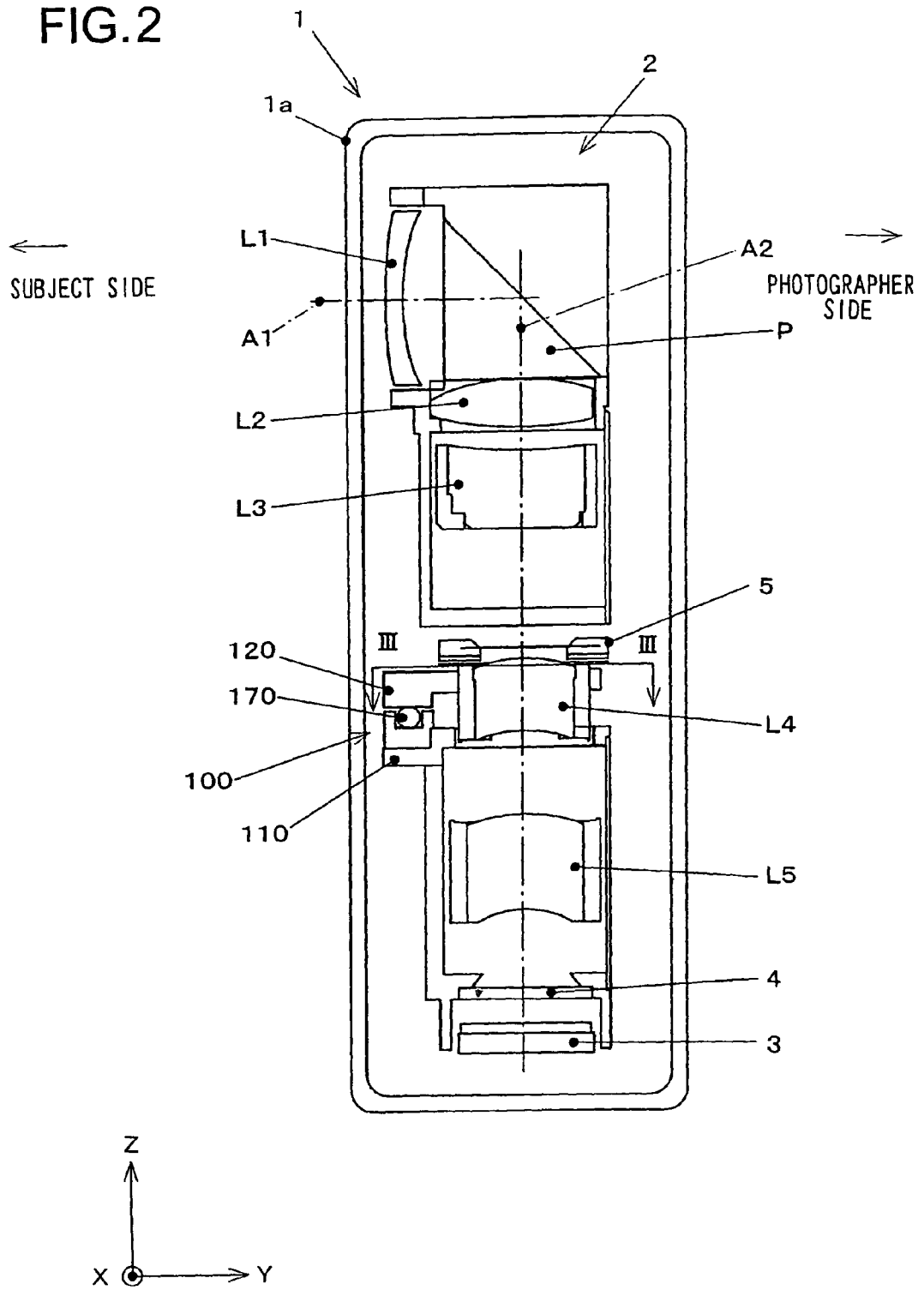
FIG. 2 is a cross-sectional view of the camera according to the embodiment.

As shown in FIG. 2, the lens barrel 2 includes a photographic optical system having a structure in which a first lens group L1, the prism P, a second lens group L2, a third lens group L3, a vibration reduction lens group (fourth lens group) L4, and a fifth lens group L5, are disposed in that order from the subject side. Furthermore, the lens barrel 2 includes the image sensor 3, a low-pass filter 4, and a shutter aperture unit 5, and so forth.

The first lens group L1 is provided at a position farthest to the subject side in the photographic optical system.

The prism P (optical-axis bending unit) is a rectangular prism which provides the total reflection of the light of the subject image output from the first lens group L1, thereby bending the direction of the optical path by 90 degrees.

Description will be made hereafter regarding the photographic optical system with the optical axis for the light input to the prism P being indicated by reference symbol A1, and with the optical axis for the light output from the prism P being indicated by reference symbol A2. At the time of capturing an image by the camera 1 in a normal state, the optical axis A1 extends along the horizontal direction with respect to the prism P, while the optical axis A2 extends along the vertical direction with respect to the prism P. Here, the term "time of capturing an image by the camera 1 in a normal state" represents the time at which the camera 1 is held level. In this state, the camera 1 is held with the horizontal direction of the camera 1 matching the direction of the optical axis A1, and with the long side of a display monitor (not shown) of the display unit 12 extending along the horizontal direction.

The second lens group L2 and other lens groups provided farther toward the image side (the side of the image sensor 3) are serially disposed downstream of the prism P.

The second lens group L2 is provided on the output side of the prism P. The second lens group L2 is provided at a fixed position relative to the prism P.

The third lens group L3 is provided on the output side of the second lens group L2, and can be moved along the optical axis A2 by an unshown lens driving motor.

The vibration reduction lens group (fourth lens group) L4 is provided on the output side of the third lens group L3, and forms a part of a vibration reduction device 100. Detailed description will be made later regarding the configuration and functions of the vibration reduction device 100. The vibration reduction lens group L4 is a vibration reduction optical system for reducing image vibration or image blur due to the vibration of the camera 1 by shifting the vibration reduction lens group L4 within a plane orthogonal to the optical axis A2. The vibration reduction lens group L4 is constituted of at least one lens.

The fifth lens group L5 is provided on the output side of the vibration reduction lens group L4, and can be moved along the optical axis A2 by an unshown lens driving motor.

The image sensor 3 is provided on the output side of the fifth lens group L5, which generates an electric image output signal based upon the light of the subject image formed on the image forming surface by the photographic optical system.

The low-pass filter (LPF) 4 is provided between the fifth lens group L5 and the image sensor 3, which prevents moire occurring in the image output signal output from the image sensor 3.

The shutter aperture unit 5 is provided on the input side of the vibration reduction lens group L4, which includes an aperture unit for controlling the light amount of the image passing through the photographic optical system and a shutter unit for adjusting the exposure period of time during which the image sensor 3 is exposed to the light.

Furthermore, the lens barrel 2 includes the vibration reduction device 100 described below.

Figure 3:
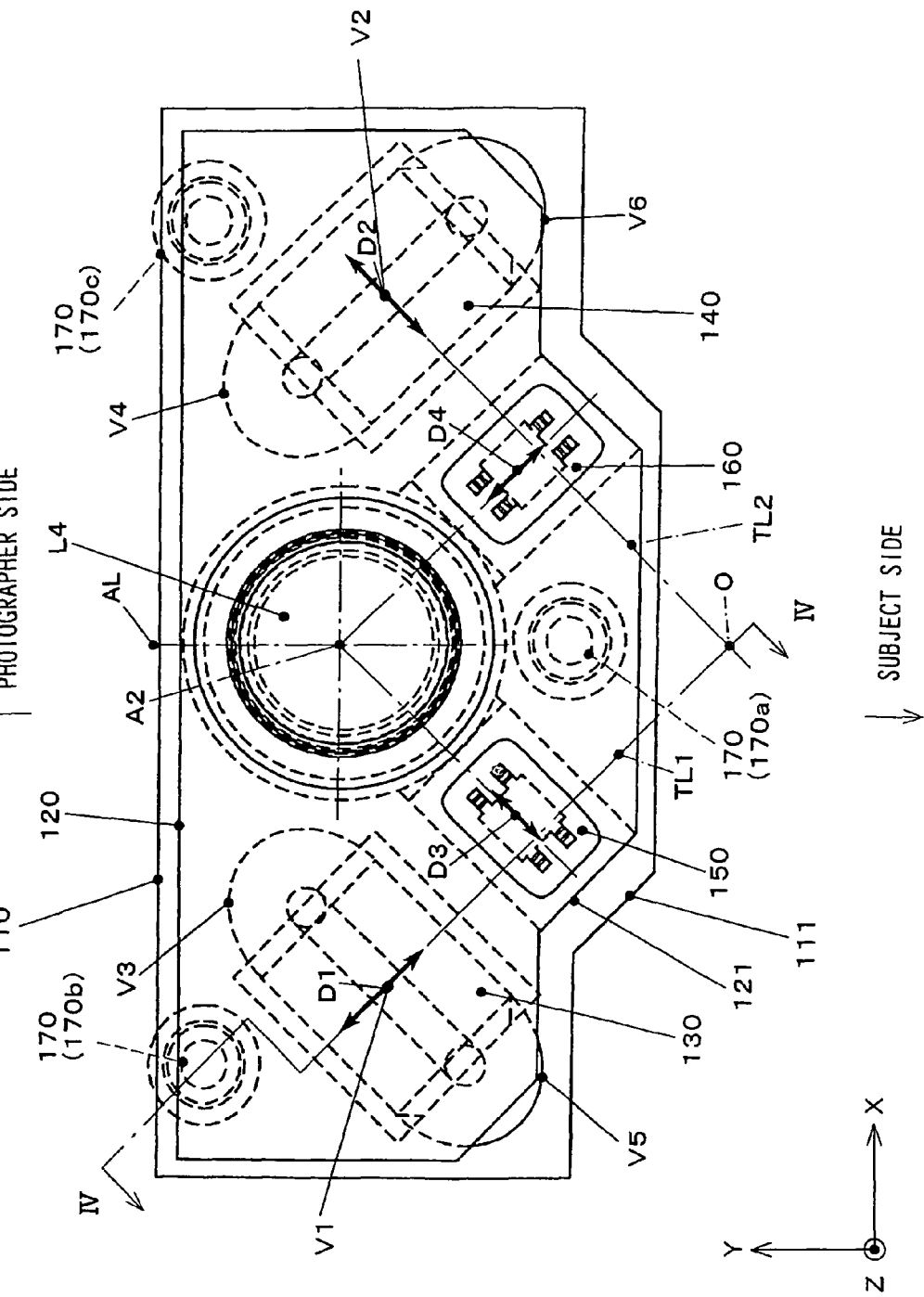
FIG. 3 is a cross-sectional view taken along line III-III in FIG. 2.

FIG. 3 is a cross-sectional view of the lens barrel 2 taken along line III-III in FIG. 2. As shown in FIG. 3, the vibration reduction device 100 includes the vibration reduction lens group L4, a fixed frame 110, a vibration frame 120, the voice coil motors 130 and 140, the position detectors 150 and 160, and steel balls 170.

The fixed frame 110 is a frame provided at a fixed position relative to the optical axis A2.

The vibration frame 120 is a holding frame for holding the vibration reduction lens group L4 at the central portion thereof. The vibration frame 120 is held in a manner that allows it to be moved relatively to the fixed frame 110 within a plane (X-Y plane) orthogonal to the optical axis A2. Note that the fixed frame 110 has an opening at a portion that corresponds to the vibration reduction lens group L4, thereby allowing the light flux to pass through the fixed frame 110 via the vibration reduction lens group L4 (see FIG. 2).

As viewed from the direction of the optical axis A2, each of the fixed frame 110 and the vibration frame 120 is formed in an approximately rectangular form having a greater width along the direction (X direction shown in FIG. 3) orthogonal to the optical axes A1 and A2 than the height along the direction (Y direction shown in FIG. 3) parallel to the optical axis A1. Furthermore, the fixed frame 110 and the vibration frame 120 have tabs 111 and 121, respectively, each of which is provided to the longer side thereof facing the subject side so as to protrude toward the subject side.

The voice coil motors (VCM) 130 and 140 are electromagnetic actuators which drive the vibration frame 120 relative to the fixed frame 110 within a plane orthogonal to the optical axis A2. The VCMs 130 and 140 are used for known vibration reduction control. With the known vibration reduction control method, the vibration frame 120 is driven by the VCMs 130 and 140 according to the angular speed of the camera 1 detected by the angular speed detector 15, thereby suppressing image vibration.

As shown in FIG. 3, the VCMs 130 and 140 are disposed distanced from each other along the longitudinal direction of the fixed frame 110 and the vibration frame 120 (X direction). With such an arrangement, each of the driving direction (thrusting direction) D1 along which the VCM 130 drives the vibration frame 120 and the driving direction (thrusting direction) D2 along which the VCM 140 drives the vibration frame 120 are inclined by 45 degrees with respect to the longitudinal direction (X direction). Furthermore, the VCMs 130 and 140 are disposed such that the driving directions D1 and D2 orthogonally intersect.

Description will be made regarding the layout of the fixed frame 110, the vibration frame 120, and the VCMs 130 and 140, with the state in which the vibration frame 120 has been centered on the fixed frame 110 as the basic position. Here, the phrase "the state in which the vibration frame 120 has been centered on the fixed frame 110" as used here represents the state in which the optical axis of the vibration reduction lens group L4 held by the vibration frame 120 substantially matches the optical axis A2 of the other lens groups as shown in FIG. 3.

Now, description will be made regarding the layout of the vibration reduction lens group L4 and the VCMs 130 and 140. Each of the VCMs 130 and 140 has a shape having a greater length along the direction orthogonal to the driving direction D1 or D2 than the length along the driving direction D1 or D2. The two VCMs 130 and 140 are disposed at positions in line symmetry with respect to the line AL which is parallel to the Y direction and which passes through the optical axis of the vibration reduction lens group L4 as shown in FIG. 3. With such a layout, the closer to the subject side, the greater the distance between the VCMs 130 and 140 is.

The vibration reduction lens group L4 is disposed such that the optical axis thereof is positioned between the VCM 130 and the VCM 140. Note that the phrase "the region between the VCM 130 and the VCM 140" describes the region surrounded by the line between the point V3 which is the point of the VCM 130 farthest to the subject side and the point V4 which is the point of the VCM 140 farthest to the photographer side, the line between the point V5 which is the point of the VCM 130 farthest to the subject side and the point V6 which is the point of the VCM 140 farthest to the subject side, and the VCM 130 and the VCM 140.

Let us refer to the line which passes through the center V1 of the VCM 130 and which is parallel to the driving direction D1 as "first driving center line (first thrusting center line) TL1. On the other hand, the line which passes through the center V2 of the VCM 140 and which is parallel to the driving direction D2 will be referred to as "second driving center line (second thrusting center line) TL2. The vibration reduction lens group L4 is disposed such that the optical axis thereof is positioned with a predetermined distance from the intersection point O of the first driving center line TL1 and the second driving center line TL2 along the Y axis direction. The aforementioned predetermined distance from the intersection point O is determined such that the optical axis of the vibration reduction lens group L4 is positioned closer to at least one of the VCM 130 and the VCM 140 than as to the intersection point O.

Alternatively, let us refer to the line which passes through the center of the VCM 130 and which is parallel to the longitudinal direction thereof as "first center line", and the line which passes through the center of the VCM 140 and which is parallel to the longitudinal direction thereof as "second center line". In this case, the vibration reduction lens group L4 may be disposed such that the optical axis thereof is positioned with a predetermined distance along the Y-axis direction from the intersection of the first center line and the second center line. Also, the vibration reduction lens group L4 may be disposed offset by a predetermined distance, along any direction that differs from the Y-axis direction, from the intersection of the first center line and the second center line.

Figure 4:
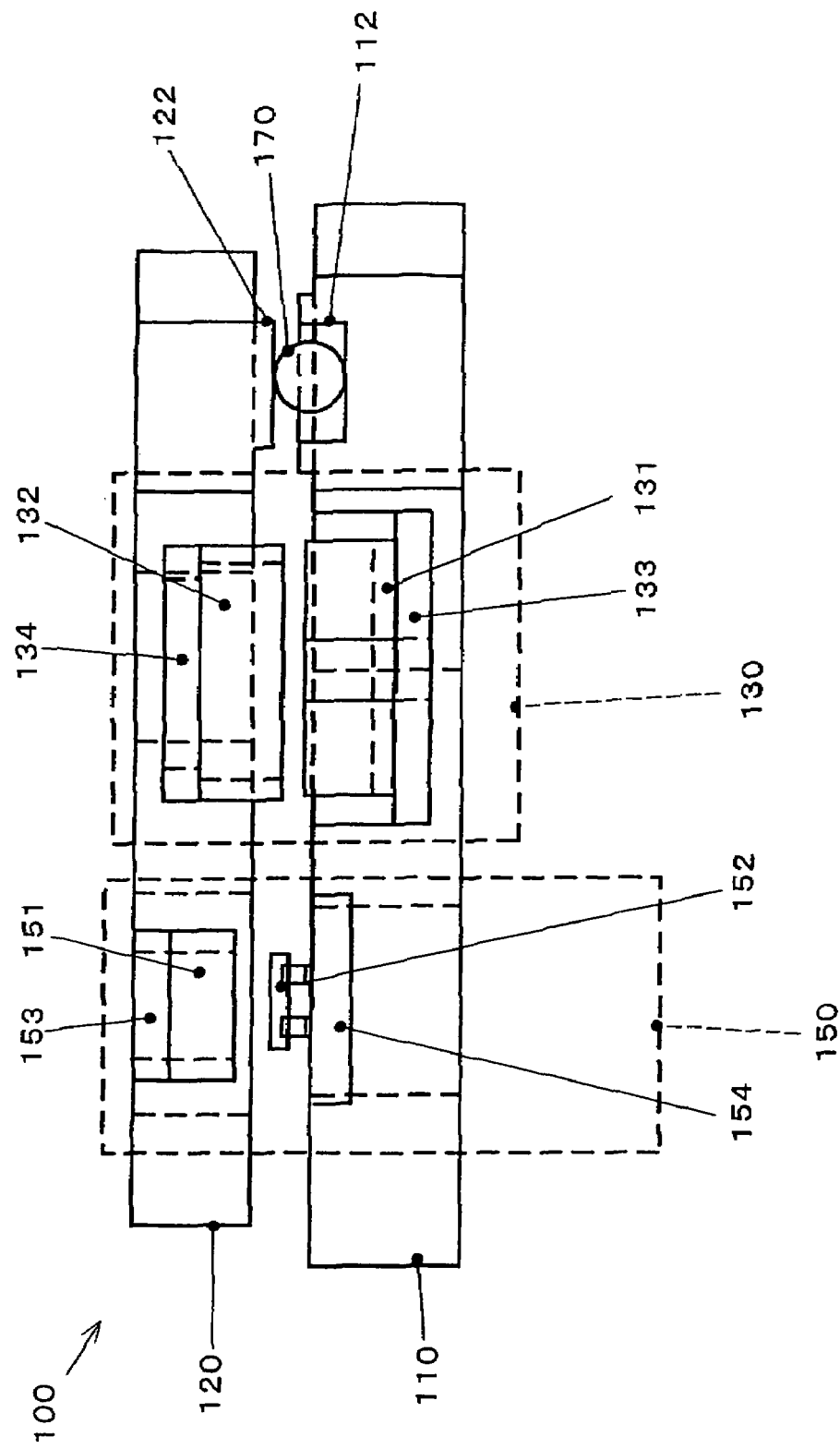
FIG. 4 is a cross-sectional view taken along line IV-IV in FIG. 3.

FIG. 4 is a cross-sectional view taken along line IV-IV in FIG. 3. The VCM 130 includes a coil 131, a magnet 132, yokes 133 and 134 as shown in FIG. 4.

The coil 131 is an electric winding fixed to the fixed frame 110 so as to face the vibration frame 120. Furthermore, the coil 131 is formed in an elliptic shape with the long axis extending along the direction orthogonal to the driving direction as shown in FIG. 3. The magnet 132 is a permanent magnet fixed to the vibration frame 120 so as to face the coil 131.

The yokes 133 and 134 are formed of a magnetic material such as a ferrous metal or the like in the shape of a plate, for example. The yoke 133 is disposed on the face of the coil 131 opposite to that facing the magnet 132. On the other hand, the yoke 134 is disposed on the face of the magnet 132 opposite to that facing the coil 131.

Note that the VCM 140 has the same structure as that of the aforementioned VCM 130.

The position detectors 150 and 160 are position sensors for detecting the position of the vibration frame 120 relative to the fixed frame 110 within the plane (X-Y plane) orthogonal to the optical axis A2. Specifically, the position detector 150 detects the position of the vibration reduction lens group L4 along the detection direction D3. On the other hand, the position detector 160 detects the position of the vibration reduction lens group L4 along the detection direction D4.

As shown in FIG. 3, the detection direction D3 of the position detector 150 is parallel to the driving direction D2 of the aforementioned VCM 140. The position detector 150 is disposed along the line which passes through the optical axis A2 and which is parallel to the detection direction D3.

Oh the other hand, the detection direction D4 of the position detector 160 is parallel to the driving direction D1 of the aforementioned VCM 130. The position detector 160 is disposed along the line which passes through the optical axis A2 and which is parallel to the detection direction D4.

Accordingly, in a case that the vibration frame 120 has been centered on the fixed frame 110, a line which extends along the detection direction D3 of the position detector 150 passing through the center of the position detector 150 and a line which extends along the detection direction D4 of the position detector 160 passing through the center of the position detector 160 intersect at the optical axis of the vibration reduction lens group L4.

The position detectors 150 and 160 are provided near the ends of the fixed frame 110 and the vibration frame 120 on the subject side. With such an arrangement, each of the position detectors 150 and 160 is disposed such that a part thereof is positioned within the aforementioned tabs 111 and 121. Furthermore, each of the position detectors 150 and 160 is disposed such that a part thereof is positioned within a region extending along the X direction between the VCMs 130 and 140. Also, each of the position detectors 150 and 160 may be disposed such that at least a part thereof is positioned between the VCMs 130 and 140.

The position detector 150 includes a magnet 151, a Hall sensor 152, and yokes 153 and 154.

The magnet 151 is a permanent magnet fixed to the vibration frame 120 so as to face the fixed frame 110. The Hall sensor 152 is provided for detecting change in the magnetic field occurring due to the magnet 151 according to the change in the position of the vibration frame 120 relative to the fixed frame 110.

The yoke 153 is disposed on the face of the magnet 151 opposite to that facing the Hall sensor 152. On the other hand, the yoke 154 is disposed on the face of the Hall sensor 152 opposite to that facing the magnet 151.

Note that the position detector 160 has the same structure as that of the aforementioned position detector 150.

The steel balls 170 are provided such that they are held between the fixed frame 110 and the vibration frame 120, which serve as rolling elements. With such an arrangement, the vibration frame 120 is held by the fixed frame 110 in a manner that allows the vibration frame 120 to be moved relative to the fixed frame 110 within a plane orthogonal to the optical axis A2.

As shown in FIG. 4, the fixed frame 110 has recesses 112 formed in the shape of a cup on the face thereof that faces the vibration frame 120. The bottom of the recess 112 is formed as a smooth surface parallel to the plane orthogonal to the optical axis A2. On the other hand, the vibration frame 120 has protrusions 122 that protrude so as to face the respective recesses 112 of the fixed frame 110. The surface of each protrusions 122 that faces the corresponding recess 112 is formed as a smooth surface parallel to the plane orthogonal to the optical axis A2.

The steel balls 170 are provided such that they are held between the bottoms of the recesses 112 and the respective surfaces of the protrusions 122 provided so as to face the recesses 112.

For example, the steel balls 170 are provided at three positions as indicated by reference numerals 170a, 170b, and 170c in FIG. 3. The steel ball 170a is provided to a region between the position detectors 150 and 160 provided in the tabs 111 and 121 of the fixed frame 110 and the vibration frame 120.

On the other hand, the steel balls 170b and 170c are provided at positions along the end of the vibration reduction device 100 on the photographer side (opposite to the subject side) and at ends of the fixed frame 110 and the vibration frame 120 in the longitudinal direction (X direction).

With such an arrangement, the VCM 130 is disposed between the steel balls 170a and 170b, and the VCM 140 is disposed between the steel balls 170a and 170c.

The aforementioned embodiment can provide the following operational effects.

(1) The VCMs 130 and 140 are disposed such that the thrusting center lines TL1 and TL2 of the VCMs 130 and 140 are inclined by 45 degrees with respect to the longitudinal direction of the vibration frame 120. Furthermore, the VCMs 130 and 140 are disposed such that the intersection O of the thrusting center lines TL1 and TL2 has an offset with respect to the optical axis of the vibration reduction lens group L4. With such an arrangement, the optical axis of the vibration reduction lens group L4 is positioned within a region extending along the longitudinal direction of the vibration frame 120 between the VCMs 130 and 140. This enables the size of the vibration reduction device 100 to be reduced along the direction orthogonal to the longitudinal direction of the vibration frame 120. This provides a camera with a reduced size, and in particular, with a reduced thickness.

(2) The position detectors 150 and 160 are disposed such that the intersection of the detection directions D3 and D4 of the position detectors 150 and 160 approximately matches the center (optical axis) of the vibration reduction lens group L4. Such an arrangement ensures the detection precision of each of the position detectors 150 and 160.

(3) The position detectors 150 and 160 are disposed within a region extending along the longitudinal direction of the vibration frame 120 between the VCMs 130 and 140. Such an arrangement provides the vibration reduction device 100 in a more compact size. Furthermore, the position detectors 150 and 160 are disposed along the end of the vibration reduction device 100 on the subject side. The fixed frame 110 and the vibration frame 120 have the tabs 111 and 121 for storing the position detectors 150 and 160. With such an arrangement, as shown in FIG. 2, the tabs 111 and 121 thus formed are disposed at positions downstream of the first lens group L1 while keeping the overall size of the camera 1 compact.

(4) The VCM 130 is disposed between a pair of the steel balls 170a and 170b, and the VCM 140 is disposed between a pair of the steel balls 170a and 170c. Such an arrangement suppresses distortion of the fixed frame 110 and the vibration frame 120 or the like. This ensures precision in holding the vibration reduction lens group L4.

(Modifications)

The present invention is not intended to be restricted to such an embodiment described above. Rather, various changes and modifications can be made, all of which are encompassed in the technical scope of equivalent structures and functions of the present invention.

(1) Description has been made in the aforementioned embodiment regarding an example of a digital still camera including an optical axis bending system. The present invention is not restricted to such an arrangement. Also, the present invention may be applied to a camera including a photographic optical system having no optical axis bending unit. For example, the present invention can be effectively applied to a so-called swivel-type camera having a structure that allows a lens barrel to be moved relatively to the other components of the camera, thereby providing a slim body for the camera. Also, the present invention can be applied to a lens barrel of an interchangeable lens camera system or a built-in camera included in a cellular phone or the like. The present invention may also be applied to a binocular.

(2) Description has been made in the aforementioned embodiment regarding an arrangement in which the two driving units (VCMs 130 and 140) are disposed such that the driving directions D1 and D2 are inclined with respect to the longitudinal direction of the vibration frame or the like. However, the present invention is not restricted to such an arrangement. Also, various modifications may be made as appropriate. For example, an arrangement may be made in which a first driving unit having a driving direction along the longitudinal direction of the vibration frame and a second driving unit having a driving direction orthogonal to the driving direction of the first driving unit are disposed along the longitudinal direction of the vibration frame, and the vibration reduction optical system or the like is disposed between the first driving unit and the second driving unit. Such an arrangement also provides the vibration reduction device with a reduced size along one direction, thereby providing a camera with a slim body.

(3) Description has been made in the aforementioned embodiment regarding an arrangement in which the driving directions D1 and D2 of a pair of the driving units match the detection directions D4 and D3 of a pair of the position detection units, respectively. However, the present invention is not restricted to such an arrangement. Also, an arrangement may be made in which the driving directions of the driving units differ from the detection directions of the position detection units. On the other hand, description has been made in the aforementioned embodiment regarding an arrangement in which the two driving directions D1 and D2 of a pair of the driving units intersect at 90 degrees, and the two detection directions D3 and D4 of a pair of the position detection units intersect at 90 degrees. However, it is not indispensable that such directions intersect at 90 degrees.

(4) Description has been made in the aforementioned embodiment regarding an arrangement in which voice coil motors are employed as the driving units 130 and 140. However, the present invention is not restricted to such an arrangement. Also, other actuators may be employed as the driving units. For example, the vibration frame may be driven by piezo elements or stepping motors employed as the driving units thereof.

(5) Description has been made in the aforementioned embodiment regarding an arrangement in which the optical axis of the vibration reduction lens group L4 is located in a region between the VCM 130 and the VCM 140. Also, an arrangement may be made in which at least a part of the vibration reduction lens group L4 is located within a region between the VCM 130 and the VCM 140, instead of the aforementioned layout in which the optical axis of the vibration reduction lens group L4 is located within this region.

(6) Description has been made in the aforementioned embodiment regarding an arrangement in which the vibration reduction lens group L4 is disposed such that the optical axis of the vibration reduction lens group L4 has an offset along the Y-axis direction from the intersection O of the first driving center line TL1 and the second driving center line TL2. Also, the optical axis of the vibration reduction lens group L4 may have some offset along a direction other than the Y-axis direction, e.g., the X-axis direction, in addition to a predetermined offset along the Y-axis direction. That is to say, the VCMs 130 and 140 may be disposed at positions having no line symmetry with respect to the line AL passing through the optical axis of the vibration reduction lens group L4.

Figure 5:
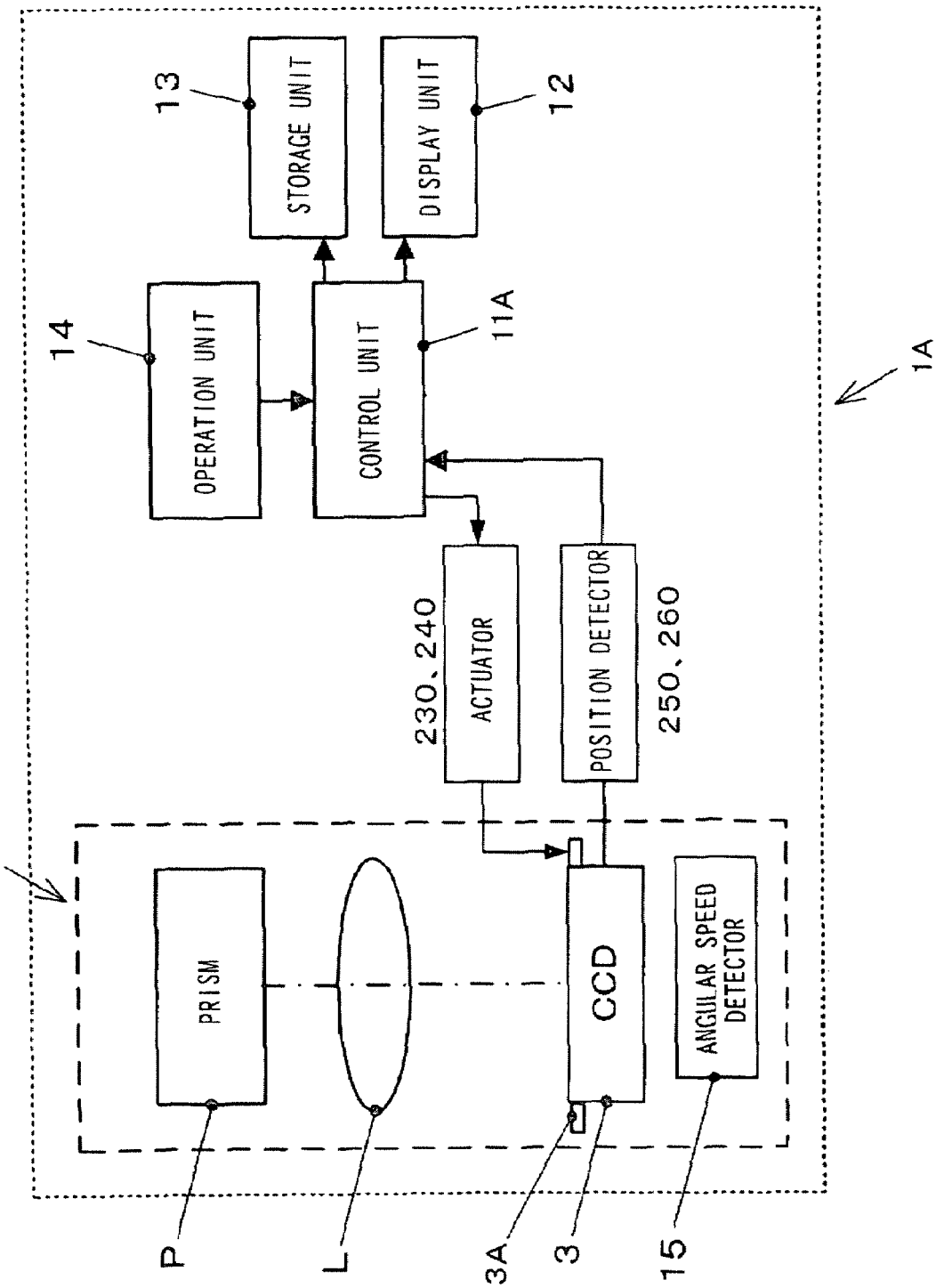
FIG. 5 is a block configuration diagram which shows a camera including a vibration reduction device according to a modification of the embodiment.

(7) Description has been made in the aforementioned embodiment regarding an arrangement in which vibration is reduced by driving and shifting the vibration reduction lens group L4 within the X-Y plane orthogonal to the optical axis A2. However, the present invention is not restricted to such an arrangement. For example, the present invention can be applied to an arrangement in which the image sensor 3 is shifted and driven along a direction that intersects with the optical axis A2. FIG. 5 is a block diagram which shows a camera 1A having such a vibration reduction device.

As shown in FIG. 5, a lens barrel 2A of the camera 1A includes the prism P, the lens L, the image sensor 3, the angular speed detector 15, and so forth, in the same way as in the above-described embodiment. The image sensor 3 is held by a movable member 3A, and is configured such that it can be moved within a plane orthogonal to the optical axis of the lens L. Note that with such an arrangement, vibration reduction control is performed by moving the image sensor 3. Accordingly, the lens L does not include the vibration reduction lens group L4.

Each of actuators 230 and 240 includes a piezo element, for example, which allows the movable member 3A that holds the image sensor 3 to be moved within the plane orthogonal to the optical axis of the lens L. Position detectors 250 and 260 detect the position of the image sensor 3 within the plane orthogonal to the optical axis of the lens L. A control unit 11A calculates the distance and the direction of the movement of the image sensor 3 based upon the detected value received from the angular speed detector 15 and the detected values received from the position detectors 250 and 260. Then, the control unit 11A transmits control signals to the actuators 230 and 240.

The layout of the actuators 230 and 240 and the position detectors 250 and 260, which takes the center of the image sensor 3 as the basic position is the same as the layout of the VCMs 130 and 140 and the position detectors 150 and 160 with the optical axis of the vibration reduction lens group L4 as the basic position according to the aforementioned embodiment. That is to say, the center of the image sensor 3 is located in a region between the actuators 230 and 240. Furthermore, the center of the image sensor 3 is located at a position with a predetermined distance from the intersection of a first driving line, which is parallel to a first direction along which the actuator 230 moves the image sensor 3 and which passes through the center of the actuator 230, and a second driving line, which is parallel to a second direction along which the actuator 240 moves the image sensor 3 and which passes through the center of the actuator 240. With such an arrangement, the predetermined distance from the intersection is determined such that the center of the image sensor 3 is located at a position closer to the actuators 230 and 240 than as to the intersection.

The above-described embodiments are examples, and various modifications can be made without departing from the scope of the invention.

What is claimed is:

1. A vibration reduction device comprising:
   an optical system that comprises a vibration reduction lens;
   a first driving unit that moves the vibration reduction lens in a first direction;
   a second driving unit that moves the vibration reduction lens in a second direction that differs from the first direction,
   wherein an optical axis of the vibration reduction lens is located between the first driving unit and the second driving unit;
   wherein the optical axis of the vibration reduction lens is located offset by a predetermined distance from an intersection of a first driving center line, which passes through a center of the first driving unit and which is parallel to the first direction, and a second driving center line which passes through a center of the second driving unit and which is parallel to the second direction; and
   wherein the predetermined distance is greater than a distance from the optical axis of the vibration reduction lens to at least one of the first driving unit and the second driving unit.

2. A vibration reduction device according to claim 1, wherein:
   a longitudinal direction of the first driving unit and a longitudinal direction of the second driving unit are orthogonal to the first direction and the second direction, respectively, and
   the first direction and the second direction intersect at 90 degrees.

3. A vibration reduction device according to claim 2, wherein:
   the first driving unit and the second driving unit are disposed on a plane orthogonal to the optical axis of the vibration reduction lens in line symmetry with respect to a predetermined line passing through the optical axis.

4. A vibration reduction device according to claim 1, further comprising:
   a holding member that holds the vibration reduction lens, wherein:
   the first driving unit and the second driving unit move the holding member within a plane orthogonal to an optical axis of the optical system so as to move the vibration reduction lens along the first direction and the second direction.

5. A vibration reduction device according to claim 4, further comprising:
   a fixed member that comprises an opening through which a light flux passes so as to pass through the vibration reduction lens, and that holds the holding member in a manner that allows the holding member to be moved within a plane orthogonal to the optical axis of the optical system.

6. A vibration reduction device according to claim 1, further comprising:
   a first position detection unit that detects a position of the vibration reduction lens along the first direction; and
   a second position detection unit that detects a position of the vibration reduction lens along the second direction, wherein:
   the optical axis of the vibration reduction lens matches an intersection of a first detection center line, which passes through a center of the first position detection unit and which is parallel to the first direction, and a second detection center line which passes through a center of the second position detection unit and which is parallel to the second direction.

7. A vibration reduction device according to claim 6, wherein:
   at least a part of the first position detection unit and the second position detection unit is disposed between the first driving unit and the second driving unit.

8. A vibration reduction device comprising:
   an optical system that comprises a vibration reduction lens;
   a first driving unit that moves the vibration reduction lens in a first direction;
   a second driving unit that moves the vibration reduction lens in a second direction that differs from the first direction;
   a first frame that holds the vibration reduction lens, the first frame being substantially rectangular; and
   a second frame that supports that first frame,
   wherein the first driving unit and the second driving unit are disposed distanced from each other along a longitude direction of the first frame, and the vibration reduction lens is located between the first driving unit and the second driving unit within the first frame.

9. A vibration reduction device according to claim 8, wherein:
   a longitudinal direction of the first driving unit and a longitudinal direction of the second driving unit are orthogonal to the first direction and the second direction, respectively; and
   the first direction and the second direction intersect at 90 degrees.

10. A vibration reduction device according to claim 9, wherein:
    the first driving unit and the second driving unit are disposed on a plane orthogonal to the optical axis of the vibration reduction lens in line symmetry with respect to a predetermined line passing through the optical axis.

11. A vibration reduction device according to claim 8 wherein:
    the first driving unit and the second driving unit move the first frame within a plane orthogonal to an optical axis of the optical system so as to move the vibration reduction lens along the first direction and the second direction.

12. A vibration reduction device according to claim 11, wherein:
    the second frame comprises an opening through which a light flux passes to pass through the vibration reduction lens, and that holds the first frame in a manner that allows the first frame to be moved within a plane orthogonal to the optical axis of the optical system.

13. A vibration reduction device according to claim 8, further comprising:
    a first position detection unit that detects a position of the vibration reduction lens along the first direction; and a second position detection unit that detects a position of the vibration reduction lens along the second direction, wherein:

the optical axis of the vibration reduction lens matches an intersection of a first detection center line, which passes through a center of the first position detection unit and which is parallel to the first direction, and a second detection center line which passes through a center of the second position detection unit and which is parallel to the second direction.

14. A vibration reduction device according to claim 13, wherein:

at least parts of the first position detection unit and the second position detection unit are disposed between the first driving unit and the second driving unit.

15. A vibration reduction device comprising:
a first member that holds a vibration reduction lens;
a second member that movably supports the first member;
a first coil motor that comprises a first coil and a first magnet and generates a driving force in a first direction to cause a relative displacement between the first member and the second member; and
a second voice coil motor that comprises a second coil and a second magnet, and generates a driving force in a second direction to cause a relative displacement between the first member and the second member, wherein:

one of the first coil and the first magnet and one of the second coil and the second magnet are disposed in the first member;
another of the first coil and the first magnet and another of the second coil and the second magnet are disposed in the second member; and
an intersection of a first line, which passes through a center of the one of the first coil and the first magnet and which is parallel to the first direction, and a second line which passes through a center of the one of the second coil and the second magnet and which is parallel to the second direction, is positioned outside the vibration reduction lens.

16. A vibration reduction device comprising:
a first member that holds a vibration reduction lens;
a second member that movably supports the first member;
a first voice coil motor that comprises a first coil and a first magnet, and generates a driving force in a first direction to cause a relative displacement between the first member and second member; and
a second voice coil motor that comprises a second coil and a second magnet, and generates a driving force in a second direction to cause a relative displacement between the first member and the second member; wherein:

one of the first coil and the first magnet and one of the second coil and the second magnet are disposed in the first member;
another of the first coil and the first magnet and another of the second coil and the second magnet are disposed in the second member; and
an intersection of a first line, which passes through a center of the one of the first coil and the first magnet and which is parallel to the first direction, and a second line which passes through a center of the one of the second coil and the second magnet and which is parallel to the second direction, is positioned outside the first member.

17. A vibration reduction device comprising:
a first member that holds a vibration reduction lens;
a second member that movably supports the first member;
a first driving unit that generates a driving force in a first direction to cause a relative displacement between the first member and the second member; and
a second driving unit that generates a driving force in a second direction to cause a relative displacement between the first member and second member, wherein:
an intersection of a first line, which passes through a center of the first driving unit and which is parallel to the first direction, and a second line which passes through a center of the second driving unit and which is parallel to the second direction, is positioned outside the vibration reduction lens.

18. A vibration reduction device according to claim 17, further comprising:
an optical system that comprises the vibration reduction lens and an optical axis bending unit that changes a direction of an optical axis of the optical system.

19. A camera comprising a vibration reduction device according to claim 17.

20. A vibration reduction device comprising:
a first member that holds a vibration reduction lens;
a second member that movably supports that first member;
a first driving unit that generates a driving force in a first direction to cause a relative displacement between the first member and the second member; and
a second driving unit that generates a driving force in a second direction to cause a relative displacement between the first member and the second member, wherein:
an intersection of a first line, which passes through a center of the first driving unit and which is parallel to the first direction, and a second line which passes through a center of the second driving unit and which is parallel to the second direction, is positioned outside the first member.

21. A camera comprising a vibration reduction device according to claim 20.

* * * * *